(12) United States Patent
Takashima et al.

(10) Patent No.: US 6,550,753 B2
(45) Date of Patent: Apr. 22, 2003

(54) ANTIVIBRATION DEVICE

(75) Inventors: Yukio Takashima, Osaka (JP);
Toshihiro Kakimoto, Osaka (JP);
Hikofumi Yamamoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/989,429

(22) Filed: Nov. 21, 2001

(65) Prior Publication Data

US 2002/0125400 A1 Sep. 12, 2002

(30) Foreign Application Priority Data

Mar. 9, 2001 (JP) ........................................ 2001-067530

(51) Int. Cl.[7] ................................................. F16F 5/00
(52) U.S. Cl. ............................ 267/140.13; 267/140.11; 267/219; 188/322.12
(58) Field of Search ..................... 267/140.13, 140.11, 267/140.14, 140.15, 219, 141.4, 35; 248/562, 636, 638; 188/322.12

(56) References Cited

U.S. PATENT DOCUMENTS

| | | | | |
|---|---|---|---|---|
| 4,858,879 A | * | 8/1989 | Miyamoto et al. | 267/140.13 |
| 4,997,169 A | * | 3/1991 | Nakamura et al. | 267/140.13 |
| 5,240,233 A | * | 8/1993 | Kato et al. | 267/140.13 |
| 5,927,698 A | * | 7/1999 | Miyoshi et al. | 267/140.13 |
| 6,120,011 A | * | 9/2000 | Maeno et al. | 267/140.11 |
| 6,250,615 B1 | * | 6/2001 | Leibach | 267/140.13 |
| 6,435,488 B1 | * | 8/2002 | Simuttis et al. | 267/140.15 |

FOREIGN PATENT DOCUMENTS

| | | | |
|---|---|---|---|
| JP | 6-307487 | * | 11/1994 |
| JP | 2000-257664 | * | 9/2000 |

* cited by examiner

Primary Examiner—Matthew C. Graham
Assistant Examiner—Mariano Sy
(74) Attorney, Agent, or Firm—Wenderoth, Lind & Ponack, L.L.P.

(57) ABSTRACT

The invention provides an antivibration device lightweight and excellent in heat interception, wherein a top opening of a main body fitting (1) and an upper attachment fitting (2) are interconnected through a vibration-isolating base (3); a stopper fitting (8) of a generally cylinder form partly cutout is connected to the main body fitting (1) with its upper edge bent inwardly to form a stopper portion (81), which is located above a stop flange (22) of the upper attachment fitting (2) and has a stopper function against a large vertical displacement; a stopper rubber member (15) is fitted to the stopper fitting (8) so as to extend from the upper surface of the stopper portion (81) to an outer surface of its side plate by vulcanization molding; the cutout portion (83) of the stopper fitting (8) is plugged by a heat shield rubber membrane portion (17) vulcanization molded integrally with the stopper rubber member (15).

12 Claims, 4 Drawing Sheets

ANTIVIBRATION DEVICE

TECHNICAL FIELD

This invention relates to an antivibration device mainly used for supporting and bearing an automotive engine, etc.

BACKGROUND ART

A liquid-sealed type of antivibration device is known in the art as a mount for bearing a vibration generator such as automotive engine so as not to transmit its vibrations to the vehicle body. This antivibration device is composed of a main body fitting to be attached and secured to a support side, an upper attachment fitting to be attached to a vibration generator side such as an engine, a thick-walled vibration-isolating base of rubber-like elastomer configured as a generally truncated conical shape interconnecting the former two, a diaphragm opposing to the vibration-isolating base fitted to the lower side of the main body fitting, an interior room between both the previous elements defined as a liquid-sealed chamber, and a partition member comparting the liquid-sealed chamber into two liquid chambers on the vibration-isolating base side and the diaphragm side, both liquid chambers communicating with each other through an orifice. And it is adapted to perform a vibration damping function and a vibration isolating function due to a liquid fluidization effect between both liquid chambers through the orifice and a vibration-absorbing effect of the vibration-isolating base.

Such an antivibration device is generally further provided with a stopper mechanism for restraining a large displacement of the upper attachment fitting beyond a definite magnitude owing to deformation of the vibration-isolating base accompanied by vibrations. With the conventional device, the stopper mechanism is constructed so that a stop flange projecting in a radial direction is provided to the upper attachment fitting, on the one hand, and a box shaped stopper fitting extending from outboard of the vibration-isolating base to above the flange is fixed to the main body fitting, with the top edge of the stopper fitting being bent inwardly to form a stopper portion, which is located between the flange and the vibration generator side member such as a bracket attached upwards of it, on the other hand. Upon a large displacement in the vertical direction, the stopper portion is thus adapted to abut on the stop flange of the upper attachment fitting and the vibration generator side member such as bracket, thereby performing a stopper action. A stopper rubber may be formed by vulcanization integrally with the stopper portion of the stopper fitting for the purposes of shock absorbing when abutting on the vibration generator side member and the stop flange.

In the abovementioned structure, the stopper fitting serves also to intercept a radiation heat or hot air from intruding into the vibration-isolating base portion. That is, if the vibration-isolating base is heated by radiation heat or the like, there arises a problem such that its characteristics change and for that reason, the aforementioned structure is adopted.

However, the stopper fitting is made of a pressed steel plate with the conventional device above, which is constructed so as to cover the overall vibration-isolating base assuring a relatively large, generally truncated conical form only with this stopper fitting. As a result, the weight of the stopper fitting itself becomes heavy, which is obstructive to rendering the weight of the antivibration device lighter. This is also true where the stopper rubber is integrally molded by vulcanization.

On the other hand, it was proposed to adopt a stopper fitting whose cylindrical body is partly cut out from the viewpoints of easiness in fixing working by crimping fastening and in assembling work. In this case, the stopper fitting can be rendered lightweight, but radiation heat or hot air enters through the cutout portion into the vibration-isolating base inside the stopper fitting. Thus there was a problem in the respect of heat intercepting effect.

The present invention has been made in view of the problems with the antivibration device provided with the stopper mechanism as described above and is contemplated providing an antivibration device which is lightweight and excellent in heat interception effect by constructing a stopper fitting in a partly cutout form so that it can be made more lightweight and concurrently can secure to intercept radiation heat from another components.

DISCLOSURE OF INVENTION

This invention relates to an antivibration device comprising a main body fitting having a cylindrical drum part, an upper attachment fitting adapted to be connected to a vibration generator side, a vibration-isolating base made of rubber-like elastomer interconnecting an upper end opening of the main body fitting and the upper attachment fitting, a stopper fitting coupled to the main body fitting, the stopper fitting assuming a generally cylinder form with a partly cutout portion and extending upwardly and outboard of the vibration-isolating base, the stopper fitting being at its upper end part bent inwardly to form a stopper portion performing a stopper action against a large vertical displacement of the upper attachment fitting. And in order to solve the aforementioned problems the device is characterized in that the stopper fitting is fitted with a stopper rubber member by vulcanization molding, the stopper rubber member extending from a top surface of the stopper portion to an outer surface of a side plate of the stopper portion, and a heat shield rubber membrane portion for plugging the cutout portion of the stopper fitting is formed by vulcanization integrally with the stopper rubber member.

According to this antivibration device, the stopper fitting is generally cylinder shaped with a partly cutout portion and the cutout portion is adapted to be plugged only by a heat shield rubber membrane portion integral with the stopper rubber member, so that it is possible to make the device more lightweight in comparison with a counterpart which comprises a stopper fitting of a usual cylindrical form covering the overall periphery of the vibration-isolating base and moreover it is possible to intercept the vibration-isolating base inside the stopper fitting from radiation heat from another components by the heat shield rubber membrane portion.

It is preferred that the stopper fitting be cut out in a range of nearly ⅓ to ¼ of the entire circumference thereof and that the heat shield rubber membrane portion be formed so as to plug the cutout portion with a shape having approximately the same radius of curvature as that of the stopper rubber member.

Being formed in this manner, the appearance is good, a weight reduction and heat intercepting effect can be exhibited satisfactorily and a good stopper action is performed. That is, if the range of the cutout portion is narrower than the above, the effect of weight reduction is smaller whereas the range of the coutout portion is larger, the range in which the stopper acts to abut is smaller and the stopper action is not performed well. This is why the aforementioned range of the cutout portion is preferred.

In the aforesaid antivibration device, the heat shield rubber membrane portion can be formed, at its circumferentially central part, with a thinner membrane portion than both lateral portions thereof longitudinally contiguous with it. Consequently, in case where the stopper rubber member and the heat shield rubber portion are molded by vulcanization integrally with the stopper fitting, a configurative change and dimensional change due to vulcanization shrinkage of the rubber membrane portion can be absorbed by the thin membrane portion and it is possible to mold without being affected by the vulcanization conditions. Moreover the thin membrane portion functions as cushion means to any external interference and can exhibit the effect of resisting a curling and tearing of the rubber membrane portion.

The aforesaid thin membrane portion preferably has a circumferential width of up to $\frac{1}{3}$ of the circumferential width of the rubber membrane portion and a thickness of up to $\frac{1}{2}$ of the thickness of the other portions of the rubber membrane portion. Thereby it is possible to retain nearly the same radius of curvature as the stopper rubber member and to adapt to changes in shape and dimension upon vulcanization molding and any deformation due to external force only by the thin membrane portion by reason of its deformation. That is, if the width of the thin membrane portion is too large, the shape retainability is reduced and if the thickness of it is too large, its ability of coping with the changes in shape and dimension is reduced.

In the aforementioned antivibration device, the upper attachment fitting has a stop flange that is extended outwardly above the upside of the vibration-isolating base and the stopper portion of the stopper fitting is arranged between the flange and a vibration generator side to be fitted and secured above the flange so as to perform a stopper action against a large vertical displacement of the upper attachment fitting. Thus a good stopper action is performed.

This invention is particularly suitably utilized in a liquid-sealed antivibration device which further comprises a diaphragm made of rubber elastomer arranged at a lower side of the main body fitting so as to oppose the vibration-isolating base, a liquid-sealed chamber of an interior enclosed by the vibration-isolating base and the diaphragm, a partition member comparting the liquid-sealed chamber into two liquid chambers on the vibration-isolating base side and the diaphragm side, and an orifice through which both chambers communicate with each other.

BEST MODE FOR CARRYING OUT THE INVENTION

Figure 1:
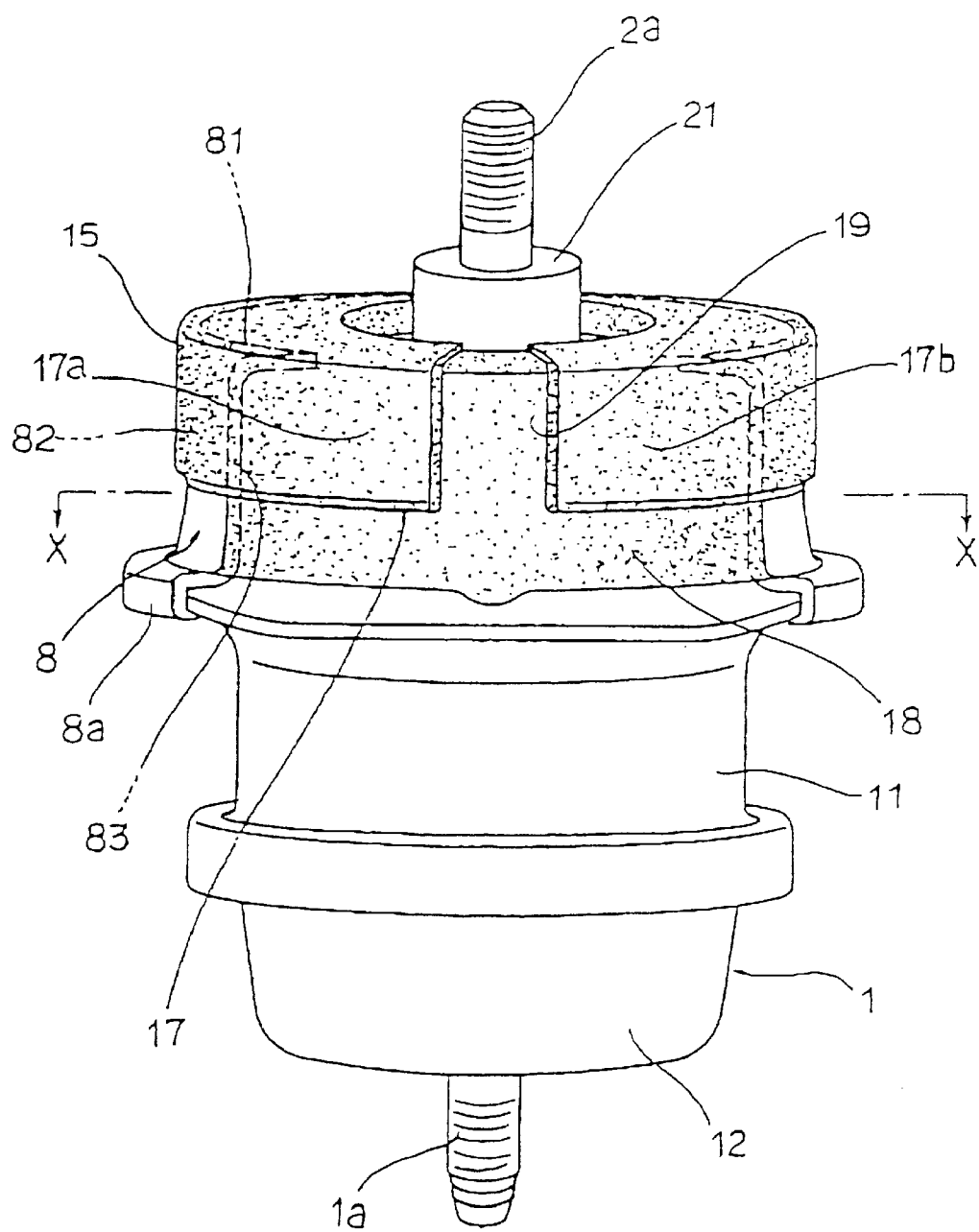
FIG. 1 is a schematic perspective view of a first example of a liquid-sealed antivibration device according to this invention.

The forms of working of this invention will be hereinafter described with reference to the drawings.

As illustrated in the figures, the liquid-sealed antivibration device relating to this invention comprises a main body fitting 1 and an upper attachment fitting 2 to be coupled to a vibration generator side, and a vibration-isolating base 3 made of rubber-like elastomer interconnecting both fittings.

The main body fitting 1 includes a cylindrical drum part 11 and a cup-form bottom part 12 as an attachment fitting fastened to the lower end thereof by crimping means, and the bottom part 12 is provided with a protruding attachment bolt 1a. The cylindrical drum part 11 and the bottom part 12 may be formed integrally, if needs be.

Figure 2:
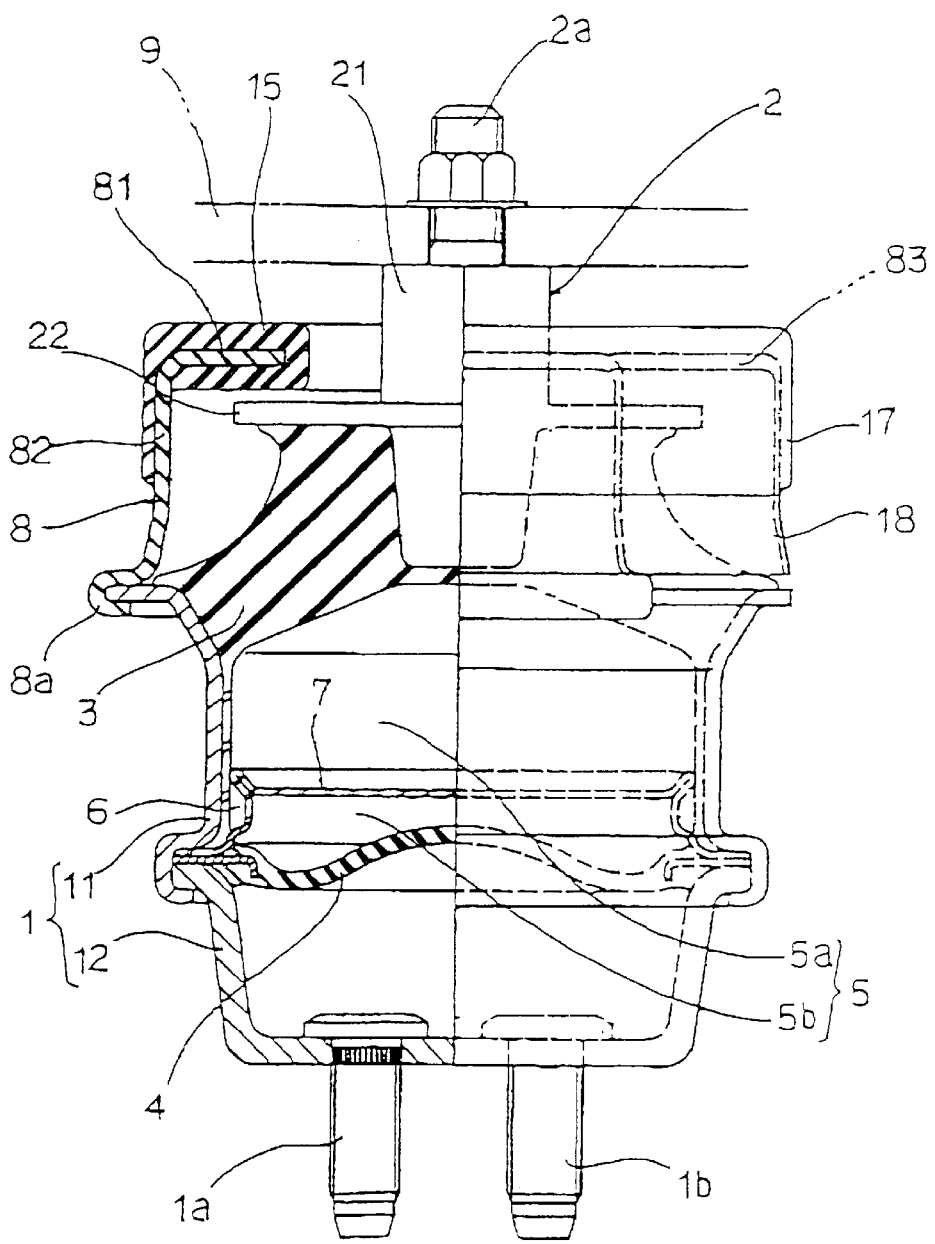
FIG. 2 is a longitudinal sectional view of the antivibration device above.

In the upper attachment fitting 2, as shown in FIG. 2, a shaft portion 21 is, at a lower part thereof, embedded in and secured to the vibration-isolating base 3 and an attachment bolt 2a is fixed above the shaft portion 21 by press fitting or welding means so that an attachment bracket or other member 9 to the vibration generator side may be locked onto the shaft portion 21.

Usually in using, the upper attachment fitting 2 is fastened to the vibration generator side such as engine and the main fitting 1 is fixed to a support side such as the body frame.

The vibration-isolating base 3 is, as shown in FIG. 2, configured as a generally truncated conical form and made of rubber-like elastomer, and the upper attachment fitting 2 is partly embedded in and secured to it on its axial center by vulcanization molding means. Further, the vibration-isolating base 3 is secured at its lower outer peripheral part to the inner peripheral surface of the cylindrical drum part 11 by vulcanization molding means.

At a lower side of the main body fitting 1 there is fitted a diaphragm 4 made of rubber membrane that is opposed to the vibration-isolating base 3, and an interior space between the diaphragm 4 and the vibration-isolating base 3 is formed as a liquid-sealed chamber 5. And at an inner periphery of the main body fitting 1 constituting the liquid-sealed chamber 5, a partition member 7 having an orifice 6 at its outer circumference is fitted liquid-tightly, thereby to compart the liquid-sealed chamber 5 into two chambers 5a, 5b on the vibration-isolating base side and the diaphragm side, concurrently with which both chambers 5a, 5b are put into communication with each other through the orifice 6. Thus a vibration-attenuating function and a vibration-isolating function are performed owing to the liquid fluidization effect between both chambers 5a, 5b and vibration-absorbing effect of the vibration-isolating base 3.

The diaphragm 4 and the partition member 7 are fixed by crimping at their outer circumferential ends integrally with a crimped portion of the cylindrical drum part 11 and the bottom part 12.

Further, the upper attachment fitting 2 is provided with a stop flange 22 at the shaft portion 21 located above its embedded portion so as to project in a radial direction, the flange 22 being adapted to abut on a stopper rubber 15 of a stopper fitting 8.

The stopper fitting 8 is formed as a generally cylindrical form extending outwards of the vibration-isolating base 3 up to an upward position of the flange 22 and its lower end 8a is fastened to the upper open end of the main body fitting 1 by crimping. The stopper fitting 8 assumes, as shown in FIG. 3, a generally cylindrical form partly with a cutout portion and its upper end is bent inwardly to form a stopper portion 81, which is in turn arranged between the stop flange 22 of the upper attachment fitting 2 and a vibration generator side member 9 to be attached and securd above it.

By that constitution, upon a large displacement in the upward direction of the upper attachment fitting 2 accompanied by vibrations, the flange 22 is adapted to abut on the stopper portion 81 thereby to perform a stopper action. On the other hand, upon a large displacement in an axially square direction (fore-and-aft and lateral directions of the vehicle) the stopper portion 81 is adapted to abut, at its inner edge, on the shaft portion 21 of the upper attachment fitting 2 at its outer circumference.

Figure 3:
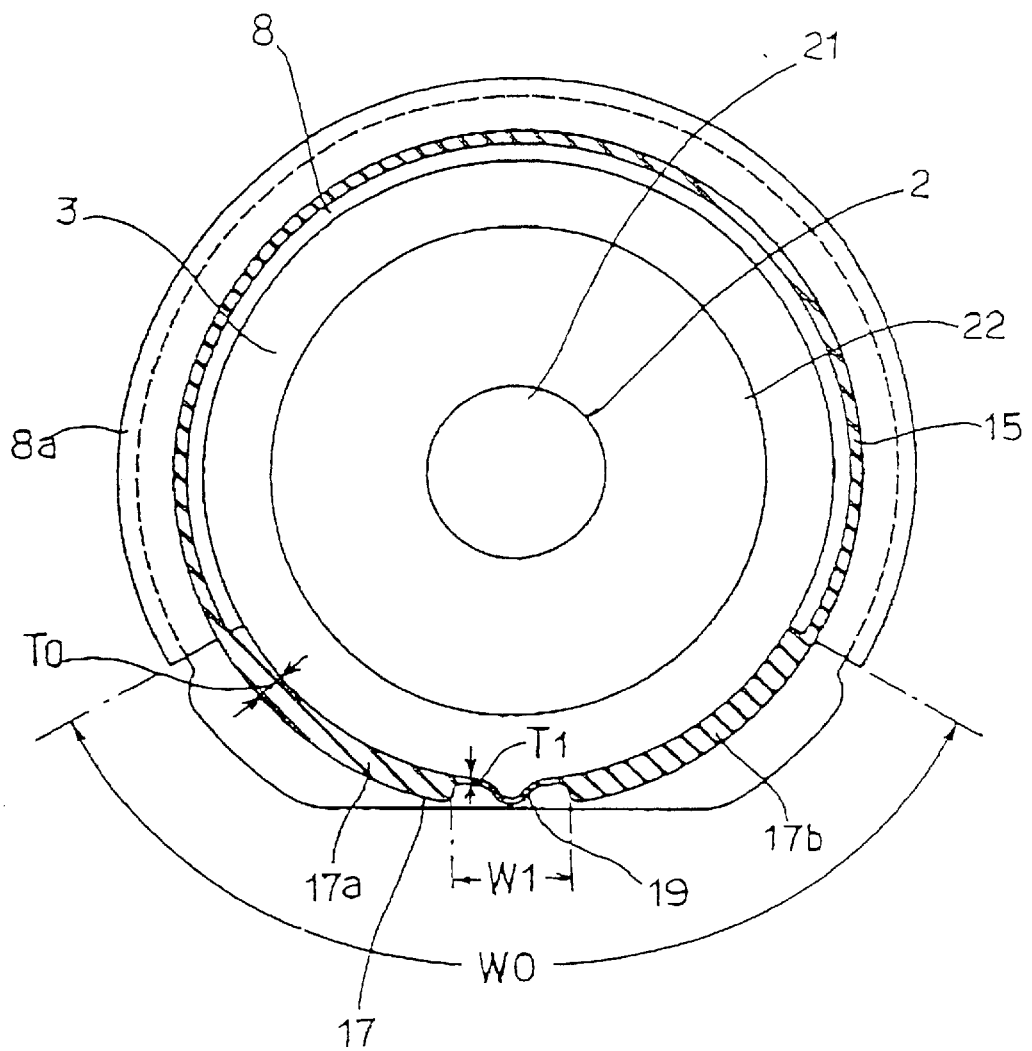
FIG. 3 is a transversal sectional view of FIG. 1 taken along X—X line.

Preferably the partly cutout cylindrical stopper fitting 8 is formed, for example as shown in FIG. 3, so that a nearly ⅓ to ½ of the entire circumference of the stopper fitting be cut out. By that means the lower end 8a can be readily crimped to the open end of the main body fitting 1, the range of crimping fastening and the abutment range upon stopper action become large, and besides the product can be rendered lightweight.

With a view to shock absorbing upon stopper action by the abuttment, the stopper fitting 8 is further fitted with a stopper rubber member 15 by vulcanization molding, which covers the entirety of stopper portion 81 inclusive of the upper and lower surfaces and inner edge and a side plate portion 82 up to its position of a required height.

Further on the stopper fitting 8, a heat shield rubber membrane portion 17 is molded by vulcanization integrally with the stopper rubber member 15 so as to plug the cutout portion 83 in a form having a nearly same radius of curvature as the stopper rubber member 15.

Figure 4:
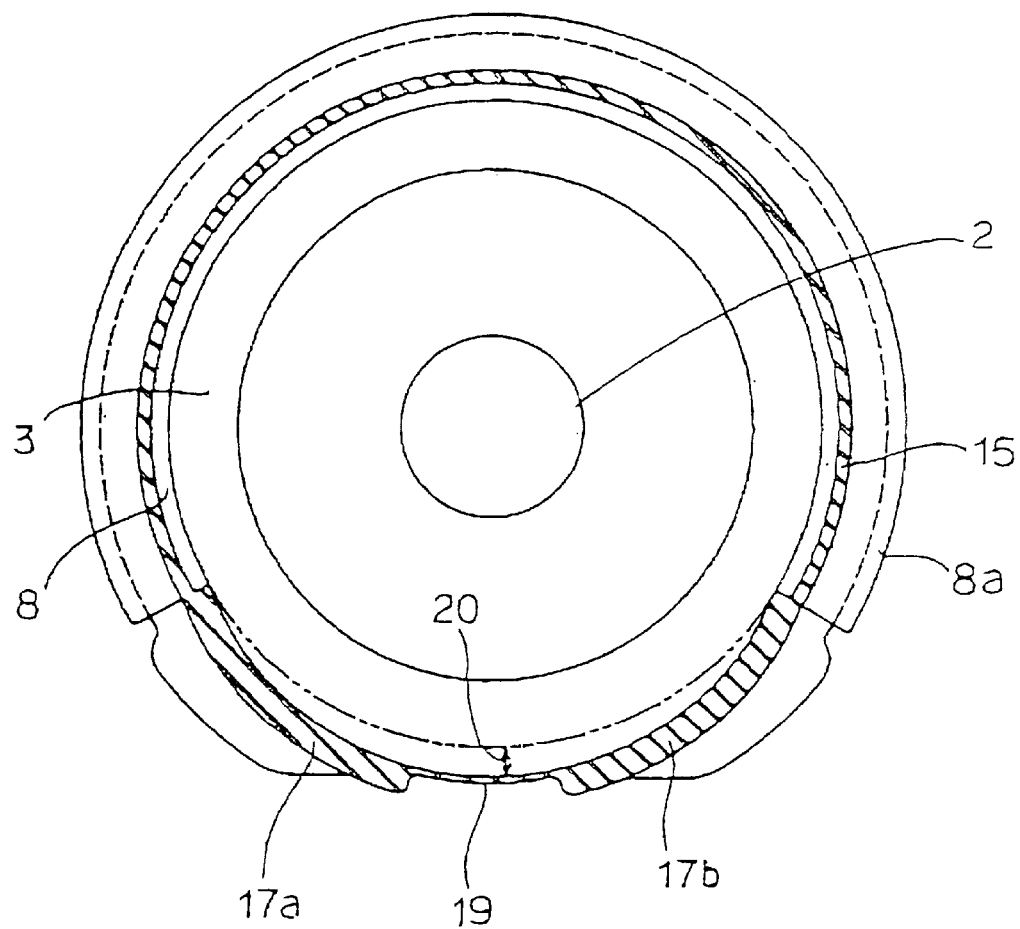
FIG. 4 is a transversal sectional view similar to FIG. 3 showing its form before vulcanization.

The heat shield rubber membrane portion 17 is configured, as shown in FIG. 4, so that its inner surface assumes a nealy same curvature surface as that of the stopper fitting 8 and its outer surface assumes, as far as nearly the same height position of it as the lower end of the stopper rubber member 15, a nearly same cuvature surface as that of the stopper rubber member 15, namely, it is configured to have a wall thickness equal to a total one of the stopper fitting 8 and the stopper rubber member 15. Downwardly of the heat shield rubber membrane portion 17 there is formed a skirt portion 18 of a slightly thin wall thickness assuming a nearly same curvature surface as the outer surface of the stopper fitting 8, the skill portion extending up to the vicinity of the upper open end of the main body fitting 1 so as to close substantially completely the cutout portion 83.

The heat shield rubber membrane portion 17 is recessed longitudinally at its circumferentially central position, at its outer surface, so as to form a thin membrane portion 19, which is thinner n thickness than both lateral portions 17a, 17b thereof and extends longitudinally contiguously so that the thin membrane portion 19 can absorb any configurative and dimensional changes ascribable to vulcanization shrinkage of the rubber membrane portion 17. In the figure the thin membrane portion 19 is formed only above the skirt portion 18.

The thin membrane portion 19 is set to have a circumferential width W1 and thickness T1 such that the thin membrane portion 19 alone can deform to cope with any configurative change and dimensional change upon molding and any deformation due to external force. To that end, the circumferential width W1 is set to be up to approximately ⅓ of the circumferential width W0 of the heat shield rubber membrane portion 17 and the thickness T1 is set to be up to ½ of the thickness T0 of the other portions.

The antivibration device as constructed above is used, for example, by fixing the main body fitting 1 to the support side such as a vehicle flame and by attaching and fixing the upper attaching fitting 2 to an attachment bracket or other member of a vibration generator such as engine. At that time, in situation where a vertical large displacement is caused to the upper attachment fitting 2 owing to vibration of the vibration generator, the stop flange 22 of the upper attachment fitting 2 or the vibration generator side member 9 can abut elastically on the stopper portion 81 of the stopper fitting 8, which assumes a generally cylindrical form partly cut out, through the stopper rubber member 15 thereby performing a stopper action without causing a large impact.

In particular, the stopper fitting 8 has a generally cylindrical form partly cut out and as such, a significant reduction in weight can be made as compared with a conventional cylindrical stopper fitting that covers the whole circumference of the vibration-isolating base. Besides the cutout portion 83 is plugged by the heat shield rubber portion 17 integral with the stopper rubber member 15, so that the appearance is good and it is possible to intercept the radiation heat or hot air of other components to protect the vibration-isolating base 3 inside the stopper fitting 8. Thus a good heat intercepting effect of the device can be exhibited.

Furthermore on account of the construction that the thin membrane portion 19 is formed at a central position of the heat shield rubber membrane portion 17, the thin membrane portion 19 is able to absorb the form change and dimensional change of the rubber membrane portion 15 due to shrinkage by vulcanization when molding by vulcanization the stopper rubber member 15 and the heat shield rubber membrane 17 integrally with the stopper fitting 8, so that the molding is not affected by vulcanization conditions. For example, as shown in FIG. 4, when the heat shield rubber membrane portion 17 before vulcanization is formed to have an allowance 20 for shrinkage taking account of the shrinkage amount after vulcanization molding, it is possible to form the rubber membrane portion 17 after vulcanization to have nearly the same shape as that of the stopper rubber member 15. Thereby the molding can be performed with accuracy.

The thin membrane portion 19 further functions as a cushion member alleviating the external interference to the rubber membrane portion 17 and can exhibit the effect of preventing curling and breaking of the rubber membrane portion 17. Moreover even if the thin membrane portion 19 is broken, the shape retention and heat intercepting performance of the entire rubber membrane portion 17 are hardly affected thereby.

The internal mechanism and overall construction of the antivibration device are not limited to the foregoing examples, but another modifications or variations in construction of the antivibration devices provided with a stopper mechanism can be similarly carried out.

INDUSTRIAL APPLICABILITY

According to the invention as described above, the antivibration device is composed of the main body fitting and the upper attachment fitting to be attached to the support side and the vibration generator side, respectively and the vibration-isolating base interposed between both fittings, and further provided with the stopper fitting performing a stopper function to a vertical large displacement, which is formed as a partly cutout shape, whereby it is possible to make the stopper fitting lightweight and further to make the antivibration device lightweight. Since the cutout portion is plugged with the heat shield rubber membrane portion integral with the stopper rubber member so as to intercept the radiation heat from another components, a good heat intercepting effect can be exhibited and the vibration-isolating base inside can be satisfactorily protected.

Furthermore in case where the thin membrane portion is formed in the heat shield rubber membrane portion, it is possible to readily cope with changes in form and dimension due to vulcanization shrinkage and change in form by external force and to mold it to a required shape with accuracy. As a consequence, the antivibration device that is lightweight and excellent in heat intercepting ability can be offered easily and at inexpensive cost.

What is claimed is:

1. An antivibration device comprising a main body fitting having a cylindrical drum part, an upper attachment fitting adapted to be connected to a vibration generator side, a vibration-isolating base made of rubber-like elastomer interconnecting an upper opening of the main body fitting and the upper attachment fitting, a stopper fitting coupled to the main body fitting, the stopper fitting assuming a generally cylinder form with a partly cutout portion and extending upwardly outboard of the vibration-isolating base, the stopper fitting being at its upper end part bent inwardly as a stopper portion performing a stopper action against a large vertical displacement of the upper attachment fitting, which device is characterized in that the stopper fitting is fitted with a stopper rubber member by vulcanization molding, the stopper rubber member extending from a top surface of the stopper portion to an outer surface of a side plate of the stopper portion, and a heat shield rubber membrane portion plugging the cutout portion of the stopper fitting is formed by vulcanization integrally with the stopper rubber member.

2. The antivibration device as set forth in claim 1, wherein the stopper fitting is cut out in a range of approximately 1/3 to 1/4 of the entire circumference thereof and the heat shield rubber membrane portion is formed in a shape having a radius of curvature nearly the same as that of the stopper rubber member so as to plug the cutout portion.

3. The antivibration device as set forth in claim 1, wherein the heat shield rubber membrane portion is formed at its circumferentially central part with a thin membrane portion having a thinner wall thickness than both lateral sides thereof longitudinally contiguous with it.

4. The antivibration device as set forth in claim 3, wherein the thin membrane portion has a circumferential width of 1/3 or less of that of the rubber membrane portion and a thickness of 1/2 or less of that of the other parts of the rubber membrane portion.

5. The antivibration device as set forth in claim 1, wherein the upper attachment fitting has a stop flange projecting outwardly of and above a top surface of the vibration-isolating base, and the stopper portion of the stopper fitting is inserted and arranged between the flange and a member on the vibration generator side to be attached and fixed above the flange and set so as to perform a stopper action against a large displacement in the vertical direction of the upper attachment fitting.

6. The antivibration device as set forth in claim 1, wherein a diaphragm of rubber elastomer is arranged on the lower side of the main body fitting in a manner opposing the vibration-isolating base, an interior room between the vibration-isolating base and the diaphragm is made into a liquid-sealed chamber, the liquid-sealed chamber is comparted by a partition member into two liquid chambers on the vibration-isolating base side and the diaphragm side, and both liquid chambers are put into communication with each other through an orifice.

7. The antivibration device as set forth in claim 2, wherein the upper attachment fitting has a stop flange projecting outwardly of and above a top surface of the vibration-isolating base, and the stopper portion of the stopper fitting is inserted and arranged between the flange and a member on the vibration generator side to be attached and fixed above the flange and set so as to perform a stopper action against a large displacement in the vertical direction of the upper attachment fitting.

8. The antivibration device as set forth in claim 3, wherein the upper attachment fitting has a stop flange projecting outwardly of and above a top surface of the vibration-isolating base, and the stopper portion of the stopper fitting is inserted and arranged between the flange and a member on the vibration generator side to be attached and fixed above the flange and set so as to perform a stopper action against a large displacement in the vertical direction of the upper attachment fitting.

9. The antivibration device as set forth in claim 4, wherein the upper attachment fitting has a stop flange projecting outwardly of and above a top surface of the vibration-isolating base, and the stopper portion of the stopper fitting is inserted and arranged between the flange and a member on the vibration generator side to be attached and fixed above the flange and set so as to perform a stopper action against a large displacement in the vertical direction of the upper attachment fitting.

10. The antivibration device as set forth in claim 2, wherein a diaphragm of rubber elastomer is arranged on the lower side of the main body fitting in a manner opposing the vibration-isolating base, an interior room between the vibration-isolating base and the diaphragm is made into a liquid-sealed chamber, the liquid-sealed chamber is comparted by a partition member into two liquid chambers on the vibration-isolating base side and the diaphragm side, and both liquid chambers are put into communication with each other through an orifice.

11. The antivibration device as set forth in claim 3, wherein a diaphragm of rubber elastomer is arranged on the lower side of the main body fitting in a manner opposing the vibration-isolating base, an interior room between the vibration-isolating base and the diaphragm is made into a liquid-sealed chamber, the liquid-sealed chamber is comparted by a partition member into two liquid chambers on the vibration-isolating base side and the diaphragm side, and both liquid chambers are put into communication with each other through an orifice.

12. The antivibration device as set forth in claim 4, wherein a diaphragm of rubber elastomer is arranged on the lower side of the main body fitting in a manner opposing the vibration-isolating base, an interior room between the vibration-isolating base and the diaphragm is made into a liquid-sealed chamber, the liquid-sealed chamber is comparted by a partition member into two liquid chambers on the vibration-isolating base side and the diaphragm side, and both liquid chambers are put into communication with each other through an orifice.

* * * * *